United States Patent [19]

Cifuentes

[11] Patent Number: 5,085,694
[45] Date of Patent: Feb. 4, 1992

[54] POLISH COMPOSITIONS
[75] Inventor: Martin E. Cifuentes, Midland, Mich.
[73] Assignee: Dow Corning Corporation, Midland, Mich.
[21] Appl. No.: 664,006
[22] Filed: Mar. 4, 1991
[51] Int. Cl.$^5$ .............................................. C09G 1/00
[52] U.S. Cl. .......................................... 106/3; 106/4; 106/5; 106/287.11; 106/287.13; 106/287.16; 525/477; 556/424; 556/446; 556/465
[58] Field of Search .............. 106/3, 4, 5, 287.11, 106/287.12, 287.13, 287.14, 287.15, 287.16; 525/477; 556/424, 446, 465

[56] References Cited

U.S. PATENT DOCUMENTS

| | | | |
|---|---|---|---|
| 3,252,825 | 5/1966 | Marzocchi | 117/126 |
| 3,393,078 | 7/1968 | Lockhart | 106/8 |
| 3,508,933 | 4/1970 | Yates | 106/10 |
| 3,509,012 | 4/1970 | Marzocchi | 161/170 |
| 3,576,779 | 4/1971 | Holdstock | 260/29.2 |
| 3,836,371 | 9/1974 | Kokoszka | 106/10 |
| 3,890,271 | 6/1975 | Kokoszka | 260/46.5 |
| 3,960,575 | 6/1976 | Martin | 106/10 |
| 4,013,475 | 3/1977 | Liebowitz | 106/10 |
| 4,218,250 | 8/1980 | Kasprzak | 106/3 |

FOREIGN PATENT DOCUMENTS 286482 11/1988 Japan .

Primary Examiner—William R. Dixon, Jr.
Assistant Examiner—Melissa Bonner
Attorney, Agent, or Firm—Alexander Weitz

[57] ABSTRACT

An improved polish having improved rub-out characteristics results when a silylated polyether film former is incorporated into a conventional polish formulation. The silylated polyether contains at least one polyoxyalkylene block selected from the group consisting of polyoxyethylene and polyoxypropylene in its molecule wherein the polyoxyalkylene block is attached through an organic connecting group to a silicon atom bearing at least one hydrolyzable group. A preferred water-in-oil emulsion embodiment of the polish is particularly suitable for automotive or marine applications.

24 Claims, No Drawings

POLISH COMPOSITIONS

FIELD OF THE INVENTION

The present invention relates to a polish composition. More particularly, the invention relates to a conventional polish composition containing a silylated polyether film former which imparts improved rub-out characteristics to the polish.

BACKGROUND OF THE INVENTION

The compounding of polish compositions for use in automotive. furniture and marine applications among others, is well established as a highly unpredictable "black art." Such formulations are available in liquid semi-solid or solid form and they are often complex mixtures which generally comprise several components selected from such items as waxes. solvents, thickeners emulsifiers. abrasive agents and polydimethylsiloxane oils, inter alia. Each of these ingredients is believed to impart certain desirable properties to the final polish composition. For example, a wax acts as a film former and is responsible for the high gloss achieved after buffing; a mild abrasive aids in the removal of weathered paint and previously applied polish residue and various organic solvents thickeners and emulsifiers enhance the application of the final polish formulation and provide stability thereto.

Recently, it has been discovered that various silicone oils, such as polydimethylsiloxane are advantageously incorporated into automotive polish formulations and are considered instrumental in imparting the highly prized characteristic of good rub-out The term "rub-out" as used herein refers to the ease with which the polish composition can be spread upon a surface to be treated allowed to dry and subsequently rubbed to a non-streaked condition. It has further been found that when the polydimethylsiloxane oils contain amine functionality, the durability of the polish is enhanced Examples of polish compositions which contain such silicone oils these compositions being illustrative of the art, may be found in the disclosures of U.S Pat. Nos. 3,393,078, 3.508.933, 3,576,779, 3,836,371, 3,890,271, 3,960,575 and 4,013,475. Yet another silicone-containing polish composition is disclosed in U.S. Pat. No. 4,218,250 to Kasprzak wherein the improvement resides in the inclusion of a cyclodimethylsiloxane fluid a polydiorganosiloxane-polyoxyalkylene copolymer and water.

As alluded to above, the rub-out performance of a polish is an important practical consideration. It is particularly critical when a large surface area such as a car body is to be polished since any reduction in the usually considerable time and physical effort required for buffing is greatly welcomed by the consumer. It is therefore not surprising that considerable attention in the polish art has focused on the attainment of improved rub-out.

SUMMARY OF THE INVENTION

Applicant has now surprisingly discovered that the rub-out performance of conventional polish compositions can be significantly improved by incorporating therein at least one silylated polyether film former. Moreover, since the silylated polyether film formers of the present invention contain hydrolyzable silicon-bonded groups which can interact with the surface of a substrate, the polish compositions containing them will exhibit excellent durability in harsh weather environments (e.g.. acid rain, road salt). The present invention therefore relates to a conventional polish composition containing at least one member selected from the group consisting of waxes, solvents, thickening agents. abrasives and emulsifiers, the improvement comprising incorporating into said polish composition a silylated polyether film former containing at least one polyoxyalkylene block selected from the group consisting of polyoxyethylene and polyoxypropylene in its molecule, said polyoxyalkylene block being attached through an organic connecting group to a silicon atom bearing at least one hydrolyzable group.

DETAILED DESCRIPTION OF THE INVENTION

For the purposes of the present invention, the types of conventional polishes which benefit from the incorporation of the silylated polyether film former, described infra are well known in the art. For example a commonly assigned application to Greenleaf and Cifuentes, filed on December 7. 1989 and having Serial No. 07/447,280, now U.S. Pat. No. 5,017,222, discloses conventional polish compositions wherein the improvement is the incorporation of micronized wax particles in addition to the otherwise conventional components. The full disclosure of this application is hereby incorporated by reference to teach such conventional polish compositions.

Briefly, these conventional polish systems typically contain a natural or synthetic wax, such as beeswax, montan, carnauba, paraffin, petrolatum, an ethylenic polymer or a polyol ether-ester; an abrasive, such as aluminum silicate diatomaceous earth, pumice, silica or tripoli; one or more solvents, such as VM & P naphtha Stoddard solvent, mineral spirits water or kerosene: and a thickening agent, such as lecithin or methyl cellulose. Although many polish formulations also contain a polydimethylsiloxane or amine-functional polydimethylsiloxane, this component may be left out of the compositions of the present invention as it is replaced by the silylated polyether film former, described infra. Preferably, the polish compositions of the present invention are formulated as water-in-oil emulsions and, in this case further contain at least one emulsifying agent, such as a polyoxyethylene sorbitan monooleate or fatty alcohol amine sulfate.

In addition to the above mentioned components, the polish compositions may contain colorants, odorants, freeze/thaw additives, corrosion inhibitors. catalysts and other ingredients normally employed by those skilled in this art.

As stated above, the improvement over old polish compositions of the art resides in the inclusion therein of at least one silylated polyether film former. In its most general form, the silylated polyether has at least one polyoxyalkylene block selected from the group consisting of polyoxyethylene and polyoxypropylene in its molecule, said polyoxyalkylene block being attached through an organic connecting group to a silicon atom bearing at least one hydrolyzable group.

Preferably, the silylated polyether has at least one unit of the average formula

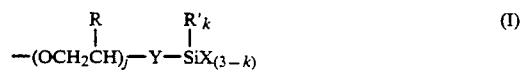

(I)

wherein each R is independently selected from the group consisting of hydrogen and a methyl radical and R' is selected from the group consisting of alkyl radicals having 1 to 6 carbon atoms and a phenyl group. Thus, the above structure contemplates both copolymers of ethylene oxide units and propylene oxide units as well as homopolymers of each species wherein j represents the total of these units and can range from 1 to about 200. The nature of connecting group Y of formula (I) is not critical and any divalent organic group which does not interact adversely with the other components of the polish may be used. However, it is preferred that the connecting group Y contain fewer than about 10 carbon atoms. The hydrolyzable group X of formula (I) is selected from the group consisting of alkoxy groups having 1 to 4 carbon atoms, acyloxy groups having 2 to 6 carbon atoms and ketoxime groups having fewer than about 10 carbon atoms while the value of k is 0 to 2. It is preferred that k =0 and that X is selected from methoxy, acetoxy or ethylmethylketoxime groups.

The above described silylated polyethers are well known and may be prepared, e.g.. by reacting an amine-functional silane with an epoxy-functional polyether as disclosed by Marzocchi in U.S. Pat. Nos. 3,252,825 and 3,509,012. Alternatively, the silylated polyethers may be prepared by the Michael addition of an amine-functional polyether to an acryloxy or methacryloxyfunctional silane as illustrated below for gamma-methacryloxypropyltrimethoxysilane:

$$CH_2=CH(CH_3)\underset{\underset{O}{\|}}{C}OCH_2CH_2CH_2Si(OCH_3)_3 +$$

$$(polyether)-NH_2 \longrightarrow$$

$$(polyether)-\underset{H}{N}-CH_2CH(CH_3)\underset{\underset{O}{\|}}{C}OCH_2CH_2CH_2Si(OCH_3)_3$$

In preferred embodiments of the present invention, the silylated polyether is obtained by reacting a glycidoxy-functional alkoxysilane with an amine-functional polyether such that the connecting group Y of formula (I) has the structure $$-\underset{H}{N}-CH_2\underset{\underset{}{|}}{\overset{OH}{C}}HCH_2-O-CH_2CH_2CH_2- \quad (IIa)$$

or the structure $$-\underset{H}{N}-C(O)-\underset{H}{N}-CH_2\overset{OH}{\underset{|}{C}}HCH_2-O-CH_2CH_2CH_2- \quad (IIb)$$

As in the case of the Michael addition, this reaction is relatively facile and can be carried out at room temperature or at slightly elevated temperatures. When reacting the amine-functional polyether with gamma-glycidoxypropyltrimethoxysilane, it is preferable to add about 1 to 2 moles of phenyltrimethoxysilane to the silylated polyether product for each mole of silane used to inhibit gelation of the product.

Further examples of preferred Y groups include the structures $$-\underset{H}{N}-CH_2CH(CH_3)\underset{\underset{O}{\|}}{C}OCH_2CH_2CH_2-$$

and $$-\underset{H}{N}-\underset{\underset{O}{\|}}{C}-\underset{H}{N}-CH_2CH(CH_3)\underset{\underset{O}{\|}}{C}OCH_2CH_2CH_2-$$

It is particularly preferred to react gamma-glycidoxypropyltrimethoxysilane with one of the monoamine-, diamine-or triamine-functional polyethers marketed by Texaco Chemical Company under the trade name JEFFAMINE ™. Examples of reaction products of an equivalent amount of gamma-glycidoxypropyltrimethoxysilane with a triamine-functional polyether include the structures $$CH_3CH_2C(CH_2-Q)_3 \quad (IIIa)$$

and $$Q-CH_2CH(Q)CH_2-Q \quad (IIIb)$$

in which each Q has the average formula $$\underset{}{\text{-(OCH}_2\overset{CH_3}{\underset{|}{C}}H)_jN}-CH_2\overset{OH}{\underset{|}{C}}HCH_2-O-CH_2CH_2CH_2-Si(OMe)_3 \quad (IV)$$

wherein Me hereinafter denotes a methyl radical. In formula (IV) the value of j is independently selected for each group Q such that the total number average molecular weight of the resultant silylated polyether is between about 500 and about 7.000, preferably about 900 to about 5.700. Likewise, examples of the reaction product of an equivalent amount of gamma-glycidoxypropyltrimethoxysilane with a diamine-functional polyether include the structure $$Q'-\overset{CH_3}{\underset{H}{N}}CHCH_2-(O\overset{CH_3}{\underset{|}{C}}H)_xN-Q' \quad (V)$$

wherein x is 1 to about 100 and Q' is selected from the group consisting of $$-CH_2\overset{OH}{\underset{|}{C}}HCH_2-O-CH_2CH_2CH_2-Si(OMe)_3$$

and $$-\underset{\underset{O}{\|}}{C}-\underset{H}{N}-CH_2\overset{OH}{\underset{|}{C}}HCH_2-O-CH_2CH_2CH_2-Si(OMe)_3$$

For the purposes of the present invention, when the silylated polyether is prepared by reacting an amine-functional component (i.e.. either the polyether or the silane). as described supra, the reactants may be combined in stoichiometric proportions such that each reactive amine hydrogen is reacted. Alternatively, this reaction may be carried out so as to leave some residual amine functionality on the silylated polyether product. In the latter situation, the residual amine functionality may then be further reacted to form a modified silylated polyether of the present invention. Neutralization of the residual reactive amine hydrogens with an acid, such as acetic acid, or reaction thereof with a lactone or propylene carbonate are illustrative of these reaction schemes. The silylated polyethers of the present invention are combined with the above described conventional polish components to form compositions suitable for use in automotive, marine and furniture polishing applications. These compositions, which are applied to the desired substrates in the conventional manner, find particular utility as automotive and boat polishes. Typically, the silylated polyether is incorporated into such a conventional polish composition at a level of about 0.1 to about 50 weight percent of the total composition, preferably between 1 and 10 weight percent.

As stated above, it is preferred that the polish compositions of the present invention are produced as water-in-oil emulsions. This is generally accomplished by first preparing a water phase comprising a dispersion of abrasives, surfactants, freeze/thaw additives and other additives, as needed in water. A separate oil phase is then prepared by thoroughly mixing waxes. organic solvents, thickening agents and at least one silylated polyether film former of the present invention in the presence of at least one emulsifying agent. Preferred emulsifying agent are selected from nonionic surfactants, such as silicone glycol copolymers or modified alkanolamide systems. For the purposes of the present invention, the phase dispersion may further contain polydimethylsiloxane oil, an amine-functional polydimethylsiloxane oil or a reactive silicone fluid or resin. In each case, the mixing may generally be accomplished by any convenient method which subjects the respective combination of components to moderate shear so as to obtain a stable dispersion. Examples of suitable equipment include Eppenbach and Lightning mixers. The water phase is then slowly added to the oil phase at room temperature, the above mentioned emulsifying agents being incorporated at a level sufficient to produce a stable. water-in-oil emulsion.

EXAMPLES

The following examples are presented to further illustrate the compositions and method of this invention, but are not to be construed as limiting the invention, which is delineated in the appended claims. All parts and percentages in the examples are on a weight basis and all measurements were obtained at 25° C, unless indicated to the contrary.

The following materials listed alphabetically for ease of reference, were employed in the examples. AQUABEAD TM 519 is described as a micronized hydrocarbon wax mixture which is marketed by Micro Powders, Inc. (Scarsdale, NY). BENTONE TM SD-3 is described as an organophilic clay rheological additive based on hectorite and produced by Rheox. Inc. (Hightstown. NJ). JEFFAMINE TM D-2000 is an amine-functional polyether having the formula

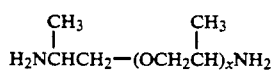

wherein x is about 33. Obtained from Texaco Chemical Company (Houston, TX).

JEFFAMINE TM T-403 is an amine-functional polyether having the formula

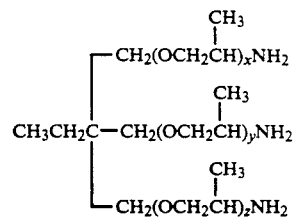

in which the sum of x, y and z is about 5.3 (Texaco Chemical Company). KAOPOLITE TM 1152 is an aluminum silicate having a median particle size of 0.70 micron and supplied by Kaopolite. Inc. (Union. NJ). TWEEN TM 20 is described as polyoxyethylene(20-)sorbitan monolaurate surfactant having an HLB of 16.7 and produced by ICI Americas Inc. (Wilmington, DE). WITCAMIDE TM 511 is a modified alkanolamide nonionic surfactant marketed by Witco Corp. (Organics Division; New York. NY). Z-6040 is a silane coupling agent consisting essentially of gamma-glycidoxypropyltrimethoxysilane and marketed by the Dow Corning Corp. (Midland, MI).

EXAMPLE 1

A silylated polyether film former of the present invention was prepared by reacting 50.0 parts of Z-6040 silane with 31.3 parts of JEFFAMINE TM T-403. The above ingredients were stirred overnight at room temperature. A portion of this product was cast onto a glass slide and, after standing overnight at room temperature, it cured to a clear, hard, tack-free film.

EXAMPLE 2

A polish formulation was prepared by first thoroughly mixing 10 parts of KAOPOLITE TM 1152. 1.0 part of propylene glycol and 0.5 part of sodium borate pentahydrate into 55.3 parts of water to form a water phase. Here, the propylene glycol and the sodium borate pentahydrate were included to provide freeze/thaw stability. An oil phase was prepared by similarly mixing 2.0 parts of AQUABEAD TM 519. 1.0 part of WITCAMIDE TM 511 and 4.0 parts of the silylated polyether of Example 1 into 26.2 parts of kerosene. The water phase was then slowly added to the oil phase using moderate shear in an Eppenbach mixer. A water-in-oil polish emulsion was obtained which was stirred for an additional ten minutes.

EXAMPLE 3

A conventional polish formulation was prepared as described in Example 2 wherein 4.0 parts of an amine-functional polydimethylsiloxane was substituted for the 4.0 parts of the silylated polyether of Example 1 in the oil phase. The amine-functional polydimethylsiloxane employed was an equilibrated copolymer having the average structure

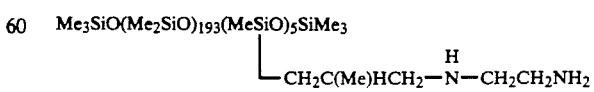

wherein Me hereinafter denotes a methyl radical.

The polish compositions of Examples 2 and 3 were applied to panels which were coated with a standard automotive finish (clearcoat on top of a basecoat). After drying for one hour, each panel was buffed in an identical manner to provide a glossy finish. It was observed that the rub-out of the polish of Example 2 was superior to that of (Comparative) Example 3.

EXAMPLE 4

A silylated polyether film former of the present invention was prepared by reacting 72.0 parts of Z-6040 silane with 50.0 parts of JEFFAMINE ™ T-403. The above ingredients were stirred overnight at room temperature, after which 60.4 parts of phenyltrimethoxysilane was added to the silylated polyether and mixed therewith for an additional hour.

EXAMPLE 5

A polish formulation was prepared according to the description given in Example 2 wherein 4.0 parts of the silylated polyether of Example 4 was substituted for the 4.0 parts of the silylated polyether of Example 1 in the oil phase. In addition. 2 parts of n-butanol was then mixed into 100 parts of the polish to form the final emulsion product.

The polish formulation of Example 5 was applied to a black enamel automotive finish and allowed to dry for one hour. Upon buffing the dried residue, it was noted that this polish exhibited superior rub-out and required less re-buffing to obtain a good glossy surface than did a similarly processed commercial polish known in the art for its ease of application.

EXAMPLE 6

A silylated polyether film former of the present invention was prepared by reacting 11.8 parts of Z-6040 silane with 50.0 parts of JEFFAMINE ™ D-2000. The above ingredients were stirred for 24 hours at room temperature, after which 9.9 parts of phenyltrimethoxysilane was added. This combination was then mixed for an additional two hours under a nitrogen purge.

EXAMPLE 7-8

Polish compositions were prepared as above wherein the water phase consisted of 10.0 parts of KAOPOLITE ™ 1152, 1.0 part of propylene glycol, 0.5 part of sodium borate pentahydrate, 0.5 part of TWEEN ™ 20 and 58.8 parts of water. The oil phase had the proportions shown in Table 1.

TABLE 1

| Oil Phase | Example 7 | Example 8 |
|---|---|---|
| AQUABEAD ™ 519 | 2.0 | 2.0 |
| Silylated Polyether of Example 6 | 4.0 | 4.0 |
| Silicone Glycol Emulsifier* | 1.0 | 1.0 |
| Polydimethylsiloxane** | — | 1.0 |
| Kerosene | 22.2 | 21.2 |

*A 75% solution in isopropanol of a silicone glycol copolymer having the calculated average structure
Me₃SiO(Me₂SiO)₂₇₃(MeSiO)₃SiMe₃
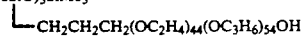
—CH₂CH₂CH₂(OC₂H₄)₄₄(OC₃H₆)₅₄OH

**Trimethylsiloxy-terminated polydimethylsiloxane having a viscosity of about 10,000 cS.

The polishes of Examples 7 and 8 were applied to panels coated with a black automotive finish, as described above, and allowed to dry for one hour. In each case, the dried residue was easily rubbed off to provide an attractive glossy surface. It was observed, however, that the polish of Example 8 exhibited a slightly higher gloss.

EXAMPLE 9

A polish formulation was prepared as in Example 2 using the silylated polyether of Example 4. In this instance, the oil phase was modified by replacing 10 parts of the kerosene therein with 10 parts of a 10% dispersion of the thickener BENTONE ™ SD-3 in kerosene. The BENTONE ™ SD-3 dispersion was prepared by mixing it with the kerosene at moderate shear.

The resultant polish had a higher initial viscosity than the previously described polishes. When applied to a dark blue enamel automotive finish and allowed to dry for one hour it exhibited superior rub-out. Further, this polish which produced a glossy defect-free finish, required less re-buffing to remove all traces of residue than did a commercial polish known in the art for its ease of use.

I claim:

1. In a conventional polish composition containing at least one member selected from the group consisting of waxes, solvents, thickening agents, abrasives and emulsifiers, the improvement comprising incorporating into said polish composition a silylated polyether film former containing at least one polyoxyalkylene block selected from the group consisting of polyoxyethylene and polyoxypropylene in its molecule said polyoxyalkylene block being attached through an organic connecting group to a silicon atom bearing at least one hydrolyzable group.

2. In a polish composition containing at least one member selected from the group consisting of waxes, solvents thickening agents. abrasives and emulsifiers, the improvement comprising incorporating into said polish composition a silylated polyether having at least one unit of the average formula

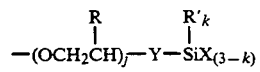

wherein each R is independently selected from the group consisting of hydrogen and a methyl radical, R' is selected from the group consisting of alkyl radicals having 1 to 6 carbon atoms and a phenyl group, Y is a divalent organic connecting group having fewer than 10 carbon atoms, X is a hydrolyzable organic group selected from the group consisting of alkoxy groups having 1 to 4 carbon atoms, acyloxy groups having 2 to 6 carbon atoms and ketoxime groups having fewer than 10 carbon atoms, j is 1 to 200 and k is 0 to 2.

3. The composition according to claim 2, wherein X is selected from the group consisting of methoxy, acetoxy and ethylmethylketoxime.

4. The composition according to claim 3, wherein Y has a structure selected from the group consisting of

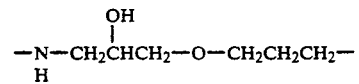

and

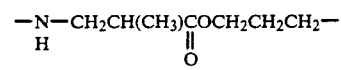

5. The composition according to claim 3, wherein Y has a structure consisting of

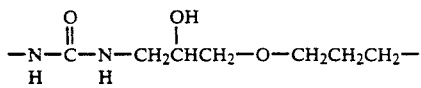

and

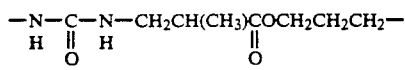

6. The composition according to claim 4 wherein said silylated polyether has a structure selected from the group consisting of

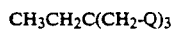
and

in which each Q has the average formula

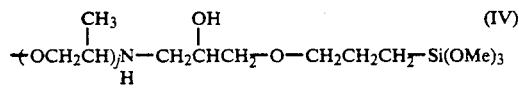

wherein Me denotes a methyl radical and the value of j is independently selected for each group Q such that the total molecular weight of said silylated polyether is between about 500 and 7,000.

7. The composition according to claim 4 wherein the silylated polyether has the average structure

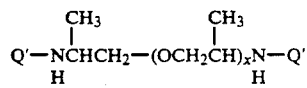

wherein x is 1 to about 100 and Q' is selected from the group consisting of

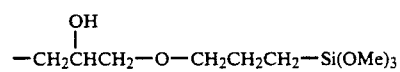

and

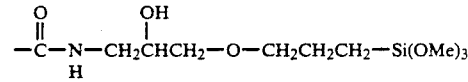

in which Me denotes a methyl radical.

8. The composition according to claim 2, wherein k is zero.

9. The composition according to claim 1, wherein said polish composition is a water-in-oil emulsion.

10. The composition according to claim 2, wherein said polish composition is a water in-oil emulsion.

11. The composition according to claim 3, wherein said polish composition is a water-in-oil emulsion.

12. The composition according to claim 4, wherein said polish composition is a water-in-oil emulsion.

13. The composition according to claim 5, wherein said polish composition is a water-in-oil emulsion.

14. The composition according to claim 6, wherein said polish composition is a water-in-oil emulsion.

15. The composition according to claim 7, wherein said polish composition is a water-in-oil emulsion.

16. The composition according to claim 8, wherein said polish composition is a water-in-oil emulsion.

17. In a method for polishing a substrate comprising spreading a polish composition onto said substrate to form a film, allowing said film to dry and then buffing said film, the improvement comprising using as said polish the composition of claim 1.

18. In a method for polishing a substrate comprising spreading a polish composition onto said substrate to form a film, allowing said film to dry and then buffing said film, the improvement comprising using as said polish the composition of claim 2.

19. In a method for polishing a substrate comprising spreading a polish composition onto said substrate to form a film, allowing said film to dry and then buffing said film the improvement comprising using as said polish the composition of claim 3.

20. In a method for polishing a substrate comprising spreading a polish composition onto said substrate to form a film, allowing said film to dry and then buffing said film the improvement comprising using as said polish the composition of claim 4.

21. In a method for polishing a substrate comprising spreading a polish composition onto said substrate to form a film, allowing said film to dry and then buffing said film, the improvement comprising using as said polish the composition of claim 5.

22. In a method for polishing a substrate comprising spreading a polish composition onto said substrate to form a film, allowing said film to dry and then buffing said film, the improvement comprising using as said polish the composition of claim 6.

23. In a method for polishing a substrate comprising spreading a polish composition onto said substrate to form a film, allowing said film to dry and then buffing said film, the improvement comprising using as said polish the composition of claim 7.

24. In a method for polishing a substrate comprising spreading a polish composition onto said substrate to form a film, allowing said film to dry and then buffing said film, the improvement comprising using as said polish the composition of claim 8.

* * * * *